Oct. 29, 1963 T. A. KUS 3,108,828
FASTENING DEVICE
Filed Sept. 29, 1961
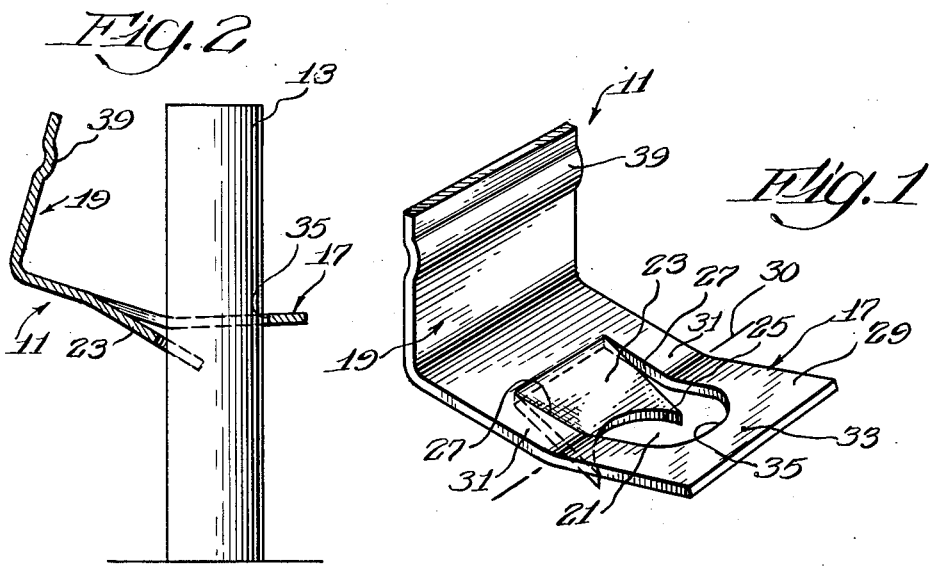
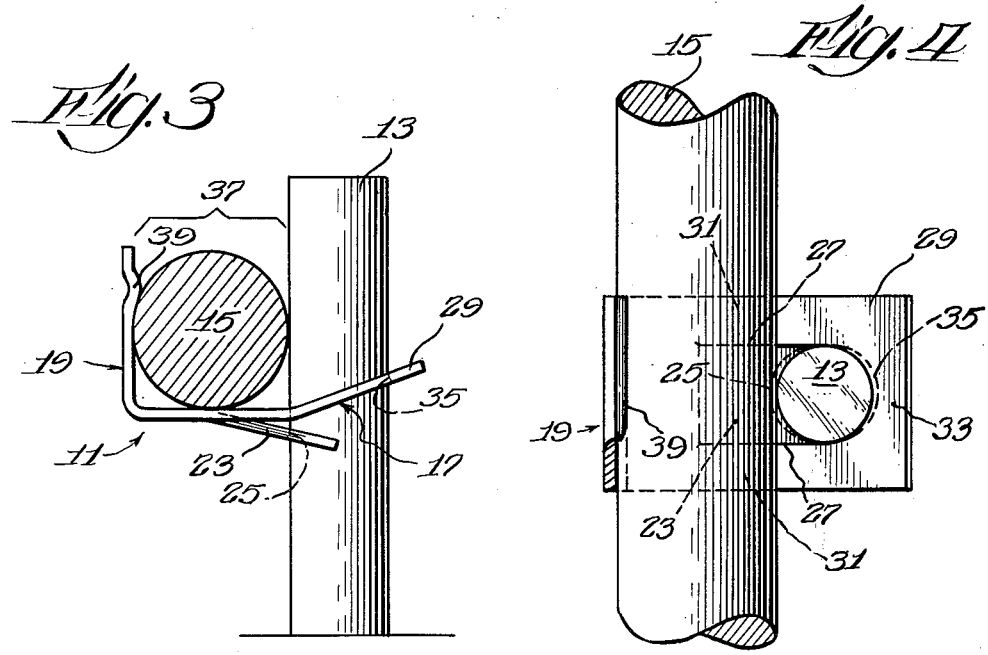
Inventor:
Theodore A. Kus

United States Patent Office 3,108,828
Patented Oct. 29, 1963

3,108,828
FASTENING DEVICE
Theodore A. Kus, Oak Lawn, Ill., assignor to Universal Form Clamp Co., Chicago, Ill., a corporation of Illinois
Filed Sept. 29, 1961, Ser. No. 141,671
3 Claims. (Cl. 287—49)

This invention relates to structural units formed from rods or the like, and in particular to fastening devices for interconnecting crossed rods which form a part of such a unit.

In the erection of structural units formed of rods or bars, it is often desirable to interconnect a pair of such rods which cross one another but do not intersect. Devices used to interconnect crossed rods must be capable of securing the rods rigidly together and should lend themselves to rapid assembly of the unit. Furthermore, they must preferably permit adjustment during the erection of the unit and, as in the case of temporary units, must be capable of easy dismantling.

A particular application of such devices in which the above characteristics are of importance is in the use of rods as a reinforcement for concrete structures. In such an application, it is desirable to erect the structure as quickly as possible and yet provide a structure which is capable of supporting its own weight as well as any additional weight which might be imposed upon the structure, such as that of the retaining forms used for poured concrete. The known devices for interconnecting such rods and supporting them relative to one another are time-consuming to use and frequently do not provide the structural characteristics required.

The principal object of the present invention is to provide an improved fastening device for interconnecting structural members in angular relation to each other.

An additional object of the invention is to provide an improved means of interconnecting rods used for the reinforcement of concrete structures.

A further object of the invention is to provide a means for interconnecting such reinforcing rods, which means can be easily and economically manufactured and which permit rapid and efficient assembly of a reinforcing structure at the site of the construction.

Other objects and advantages of the invention will become apparent with reference to the following description and the accompanying one sheet of drawings.

In the drawings:

FIGURE 1 is a perspective view of a fasteneng device formed in accordance with the present invention;

FIGURE 2 is an end view, in section, of the device of FIGURE 1 as it appears positioned for sliding movement on a single rod;

FIGURE 3 is an end view of the device of FIGURE 1, showing one way in which rods may be interconnected by means of the device; and FIGURE 4 is a partially broken-away top plan view of the device and rods shown in FIGURE 2.

Very generally, the device comprises a bracket 11 which is adapted to interconnect a pair of crossed rods 13 and 15 incident to the formation of a structural unit. While the arrangement of the rods may be varied to suit particular needs, the following description relates particularly to arrangements in which the interconnected rods are disposed at right angles to each other, with one rod being generally horizontal and the other rod disposed vertically. Generally, the bracket 11 provides a pressure engagement between the crossed rods at any selected position therealong.

As seen in FIGURES 1 through 3, the bracket 11 is formed of a generally flat piece of rectangular stock which is bent so as to provide a pair of legs 17 and 19 disposed generally at right angles to one another. The first leg 17 receives the rod 13 through an opening in the leg, and the second leg 19 cooperates with the leg 17 to provide a support for the rod 15 and to clamp the rod 15 to the rod 13.

In the illustrated embodiment, the rods 13 and 15 are disposed to provide reinforcement for a concrete structure, with the rod 13 having one end resting on a supporting surface and extending generally vertically. The reinforcing rod 15 is disposed in elevated relation to the ground along a generally horizontal path and is secured in position on the reinforcing rod 13 by means of the bracket 11. In such arrangement, of course, there will be a plurality of the vertical rods 13 disposed in spaced-apart, generally co-planar relation, with each vertical rod being attached to the horizontal rod 15 by one of the brackets 11.

For convenience of reference, the leg 17 of bracket 11 will hereafter be referred to as horizontal, and the edge thereof from which the leg 19 extends upwardly will be referred to as the rearward edge of the leg 17 and hence the rearward edge of the bracket 11. Referring to the horizontal leg 17, there is provided therein an opening 21 of a diameter slightly greater than that of the vertical rod 13, so as to permit the bracket 11 to slide axially on the rod 13 and thereby permit adjustments during assembly. The central portion of the bracket leg 17 is suitably punched or otherwise cut to form a tongue-like section 23, which defines the rearward perimeter of the opening 21 and which is bent downwardly at an acute angle to the plane of the leg 17. More particularly, this tongue is formed by a pair of slits 27 which extend parallel to one another and to the side edges of the leg 17 and which are essentially tangent to the opening 21 at the opposite side edges thereof. Each of the slits 27 extends from the opening 21 rearwardly of the leg 17 to a point spaced from the leg 19 by a distance equal to approximately one-half the diameter of the horizontal rod 15.

In addition to having the tongue 23, the bracket leg 17 has its forward portion 29 bent upwardly at an acute angle relative to the plane of the remainder of the leg. This bend is provided along an imaginary line 30 (FIGURE 1) which is tangent to the opening 21 at its rearward edge. The forward portion 29 is substantially U-shaped and includes narrow arms 31 (FIGURE 4) which border the sides of the opening 21 and are connected by a transverse strip 33. The rearwardly facing edge 35 of strip 33 is arcuate in shape and forms a rearwardly directed bearing surface which is adapted to engage one side of the rod 13. A similar arcuate bearing surface 25 is provided on the forward edge of the tongue 23 to engage the opposite side of the rod 13.

It will be noted, with reference to FIGURE 2, that the arcuate bearing edges 25 and 35 are spaced relative to one another and relative to the main portion of the bracket leg 17. Consequently, while the opening-defining edges 25 and 35 permit sliding movement of the bracekt 11 axially of the vertical rod 13 prior to the insertion of rod 15 (FIGURE 2), these edges will bear forcibly against the rod 13 so as to restrain such movement when a force is applied to the bracket 11 which tends to pivot or cant the bracket relative to the rod 13 such as the forcible insertion of rod 15 between leg 19 and rod 13. In this latter respect, the second leg 19 of the bracket 11 extends upwardly from the rearward edge of the leg 17 and, when the bracket is positioned on the vertical rod 13, cooperates with the rod to define a gap 37 within which the horizontal rod 15 is secured. The gap 37 is of a width slightly less than the diameter of the horizontal rod 15, and the bracket is sufficiently resilient so that the rod 15 can be forced into a position of engagement with the bracket legs 17 and 19, and the rod 13 and held in such position by the forwardly biasing force exerted by the leg 19. A forwardly directed rib or corrugation 39 is provided adjacent the upper edge of the leg 19 to insure that the rod 15 will not be accidentally displaced from the gap 37.

When the horizontal rod 15 is positioned within the gap 37, it biases the leg 19 rearwardly from the vertical rod 13, tending to cause the bracket 11 to pivot or cant so that the bearing surface 25 of the tongue and the arcuate edge 35 on forward portion 29 are forced into intimate and binding contact with the vertical rod 13 and, consequently, such edge surfaces restrain axial movement of the bracket 11 relative to the rod 13. Hence, when the rod 15 has been secured in place, the structure becomes rigid and the rods 13 and 15 are held against any relative movement.

In assembling a structural unit using the bracket 11, it is preferable to begin by arranging two or more rods 13 in a generally vertical position and then placing one of the brackets 11 over each of the rods at the height at which it is desired to suspend the horizontal rod 15. The rod 15 is then raised to the level of the bracket 11 and snapped into the gap 37 intermediate the second leg 19 and the vertical rod 13, thereby clamping the rods 13 and 15 to one another. The securing of the horizontal rod 15 within the gap 37 rigidly locates the bracket 11 relative to the vertical rod 13 and prevents movement thereon.

While the bracket 11, as shown and described, connects the rods 13 and 15 at right angles to one another, it should be apparent that the bracket could be modified to interconnect such rods at various angles if desired. For example, the bracket 11 could be formed to provide other than a right angle between the axis of opening 21 and the rearward flat portion of leg 17, so that the rods 13 and 15 would be secured in position at a predetermined angle to each other.

With reference to the foregoing, it will be appreciated that the bracket 11 permits a structural unit to be adjustably assembled quickly and easily and thereby provide an appreciable saving of time and consequent saving in construction costs. The bracket is also economical in that it can be manufactured from a single piece of metal stock by a stamping operation, and a single bracket is effective to interconnect a pair of rods at any one point at which they cross one another.

Various of the features of the invention are set forth in the following claims.

What is claimed is:

1. A fastening device for interconnecting a pair of crossed rods or the like in angular disposition relative to one another in a structural unit, which device comprises a relatively rigid bracket including a first leg having an opening therein of sufficient size so as to accommodate one of the rods, said leg including a pair of bearing surfaces adjacent diametrically opposed edge portions of said opening, a portion of said leg being offset so as to space said opposed edge portions longitudinally of an axis normal to the plane of the opening so as to be positionable to restrain movement of said device axially of the one rod when said surfaces bear against it, and a second leg connected to said first leg and extending therefrom in spaced relation to the opening in said first leg so as to define a gap between said second leg and said opening of sufficient size to receive the other of said rods in a position of forced engagement between said second leg and the other of the pair of rods.

2. A bracket for interconnecting a pair of crossed rods or the like in angular disposition relative to one another in a structural unit, which bracket comprises a first leg having an opening therein of sufficient size so as to accommodate one of the rods, said opening being defined on diametrically opposed edge portions by arcuate bearing surfaces spaced-apart lengthwise of the axis of said opening and in position to restrain movement of said bracket axially of the one rod when said surfaces bear against it, a second leg connected to said first leg in spaced and generally parallel relation to the axis of the opening in said first leg and on the side thereof adjacent one of said arcuate surfaces so as to define a gap between said second leg and said opening of sufficient size to receive the other of the rods in forced engagement between said second leg and the first rod, said second leg extending from said first leg in such a direction as to cause said surfaces to bear against the one rod when the other rod is disposed in said gap, and means for maintaining the second rod within said gap.

3. A joint including a pair of rods, and a bracket interconnecting said pair of rods in mutually perpendicular relation to one another, said bracket comprising a first leg having an opening therein, one of said pair of rods being slidably disposed within said opening in generally perpendicular relation to said first leg, said opening being partially defined on one side by the arcuate forward edge of a downwardly directed and offset portion of said leg and on the opposite side by a rearward arcuate edge of an upwardly directed and offset portion of said leg, said forward and rearward edges being disposed on diametrically opposite sides of said opening and defining bearing surfaces spaced axially from one another relative to said one rod, a second leg extending upwardly from said first leg in spaced, parallel relation to said one rod so as to define a gap between said second leg and said one rod, and the other of said rods being disposed in said gap in forced engagement between said second leg and said one rod, whereby said arcuate edges are forced into holding engagement with said one rod, and said second leg including a forwardly directed corrugation engaging said other rod at a position maintaining said other rod within said gap.

References Cited in the file of this patent

UNITED STATES PATENTS

| | | |
|---|---|---|
| 2,599,303 | Ward | June 3, 1952 |
| 2,805,277 | Moeller | Sept. 3, 1957 |
| 2,969,947 | Tonneson | Jan. 31, 1961 |

FOREIGN PATENTS

| | | |
|---|---|---|
| 1,062,744 | France | Dec. 9, 1953 |